(12) United States Patent
Kim et al.

(10) Patent No.: US 10,897,737 B2
(45) Date of Patent: Jan. 19, 2021

(54) METHOD FOR REDUCING ERRONEOUS NETWORK ALLOCATION VECTOR (NAV) UPDATES IN WIRELESS LAN SYSTEM, AND DEVICE THEREFOR

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/081,371

(22) PCT Filed: Apr. 26, 2017

(86) PCT No.: PCT/KR2017/004405
§ 371 (c)(1),
(2) Date: Aug. 30, 2018

(87) PCT Pub. No.: WO2017/188713
PCT Pub. Date: Nov. 2, 2017

(65) Prior Publication Data
US 2019/0082387 A1 Mar. 14, 2019

Related U.S. Application Data

(60) Provisional application No. 62/327,445, filed on Apr. 26, 2016, provisional application No. 62/412,226, (Continued)

(51) Int. Cl.
*H04W 84/12* (2009.01)
*H04W 52/02* (2009.01)
(Continued)

(52) U.S. Cl.
CPC ... *H04W 52/0206* (2013.01); *H04W 52/0216* (2013.01); *H04W 52/0219* (2013.01);
(Continued)

(58) Field of Classification Search
CPC ......... H04W 52/0206; H04W 72/0446; H04W 88/08; H04W 84/12
See application file for complete search history.

(56) References Cited

U.S. PATENT DOCUMENTS

| 10,321,485 B1* | 6/2019 | Noh ........................ H04W 8/26 |
| 2012/0224521 A1* | 9/2012 | Zhu .................. H04W 52/0216 370/311 |

(Continued)

FOREIGN PATENT DOCUMENTS

| WO | 2015112780 | 7/2015 |
| WO | 2015120488 | 8/2015 |

(Continued)

OTHER PUBLICATIONS

Draft Standard for Information technology—Telecommunications and information exchange between systems Local and metropolitan networks—Specific requirements; Part 11 Wireless LAN Medium Access Control (MAC) and Physical (PHY) Specifications, IEEE P802.11ah/D2.0, Jun. 2014, 582 pages (Year: 2014).*

(Continued)

*Primary Examiner* — Un C Cho
*Assistant Examiner* — Lalita W Pace
(74) *Attorney, Agent, or Firm* — Lee Hong Degerman Kang Waimey

(57) ABSTRACT

When an AP senses a BSS Color collision with a neighbor BSS in a wireless LAN system, the AP can notify a STA of the collision through information indicating whether the BSS Color is deactivated, and the STA performs intra-PDDU power saving only when the information indicating (Continued)

whether the BSS Color is deactivated does not indicate a deactivation.

10 Claims, 12 Drawing Sheets

Related U.S. Application Data filed on Oct. 24, 2016, provisional application No. 62/434,423, filed on Dec. 15, 2016.

(51) Int. Cl.
*H04W 72/04* (2009.01)
*H04W 88/08* (2009.01)

(52) U.S. Cl.
CPC ... *H04W 52/0229* (2013.01); *H04W 72/0446* (2013.01); *H04W 84/12* (2013.01); *H04W 88/08* (2013.01); *Y02D 30/70* (2020.08)

(56) References Cited

U.S. PATENT DOCUMENTS

| | | | |
|---|---|---|---|
| 2016/0330685 A1* | 11/2016 | Asterjadhi | H04W 52/0212 |
| 2017/0257817 A1* | 9/2017 | Itagaki | H04W 84/12 |
| 2018/0007689 A1* | 1/2018 | Patil | H04L 69/22 |
| 2018/0020448 A1* | 1/2018 | Huang | H04B 7/0452 |
| 2018/0054818 A1* | 2/2018 | Kakani | H04L 5/0053 |
| 2018/0146426 A1* | 5/2018 | Park | H04W 74/002 |
| 2018/0295567 A1* | 10/2018 | Ko | H04W 84/12 |

FOREIGN PATENT DOCUMENTS

| | | |
|---|---|---|
| WO | 2016021792 | 2/2016 |
| WO | 2016039534 | 3/2016 |

OTHER PUBLICATIONS

PCT International Application No. PCT/KR2017/004405, International Search Report dated Jul. 28, 2017, 4 pages.
Wilus, "BSS Color Settings for a Multiple BSSID Set", doc.: IEEE 802.11-16/0042r1, Jan. 18, 2016, 11 pages.
Wilus, "Issues on BSS Color Bits Collision", doc.: IEEE 802.11-16/0396r0, Mar. 14, 2016, 18 pages.
European Patent Office Application Serial No. 17789897.0, Search Report dated Aug. 20, 2019, 6 pages.
Asterjadhi, et al., "Identifiers in HE PPDUs for power saving", IEEE 802.11-15/1122r0, Sep. 2015, 18 pages.

* cited by examiner

FIG. 6

| | B0 B5 | B6 B8 | B9 | B10 B19 | B20 | B21 | B22 B27 | B28 | B29 | B30 | B31 |
|---|---|---|---|---|---|---|---|---|---|---|---|
| | BSS Color | DefaultPE Duration | TWT Required | HE Duration Based RTS Threshold | Partial BSS Color | VHT Operation Information Present | Reserved | Multiple BSSID AP | TxBSSID Indicator | BSS Color Disabled | Dual Beacon |
| Bits: | 6 | 3 | 1 | 10 | 1 | 1 | 6 | 1 | 1 | 1 | 1 |

METHOD FOR REDUCING ERRONEOUS NETWORK ALLOCATION VECTOR (NAV) UPDATES IN WIRELESS LAN SYSTEM, AND DEVICE THEREFOR

CROSS-REFERENCE TO RELATED APPLICATIONS

This application is the National Stage filing under 35 U.S.C. 371 of International Application No. PCT/KR2017/004405, filed on Apr. 26, 2017, which claims the benefit of U.S. Provisional Application No. 62/327,445, filed on Apr. 26, 2016, 62/412,226, filed on Oct. 24, 2016 and 62/434,423, filed on Dec. 15, 2016, the contents of which are all hereby incorporated by reference herein in their entirety.

TECHNICAL FIELD

The present invention relates to a wireless local area network (WLAN) system, and more particularly, to a method for reducing power consumption based on a basic service set (BSS) color and apparatus therefor.

BACKGROUND ART

While the proposed method for reducing the power consumption based on the BSS color can be applied to various wireless communication systems, the WLAN system is described as an example of the system to which the present invention can be applied.

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE OF THE INVENTION

Technical Task

Recently, the introduction of intra-PPDU power saving has been discussed in the IEEE 802.11 ax system. According to the intra-PPDU power saving, when a station (STA) receives a frame which is not intended for the STA, the STA can enter a doze state until the end of the corresponding frame for the purpose of power saving.

However, since the number of bits for representing BSS color information used by the STA to distinguish whether the received frame is intended for the STA is limited, it may cause not only a BSS color collision with a neighboring BSS but also malfunction of the STA.

That is, the object of the present invention is to provide a method for efficiently reducing power consumption of an STA even when there is a BSS color collision and apparatus therefor.

It will be appreciated by persons skilled in the art that the objects that could be achieved with the present invention are not limited to what has been particularly described hereinabove and other objects that the present invention could achieve will be more clearly understood from the following detailed description.

Technical Solution

In a first aspect of the present invention, provided herein is a method for reducing power consumption by a station (STA) in a wireless local area network (WLAN) system, including: receiving, from an access point (AP), information indicating whether a basic service set (BSS) color is disabled; receiving a frame including BSS color information; and when a BSS color included in the BSS color information is identical to that of a BSS to which the STA belongs, the frame is not intended for the STA, and the BSS color disabled information does not indicate that the BSS color information is disabled, entering a doze state until an end of the frame.

Preferably, when the BSS color disabled information indicates that the BSS color information is disabled, the STA may not enter the doze state until the end of the frame regardless of whether the BSS color is identical to that of the BSS to which the STA belongs and whether the frame is intended for the STA.

Preferably, when the AP detects a BSS color collision with an overlapping BSS (OBSS), the BSS color disabled information may be set to a first value for indicating that the BSS color information is disabled.

Preferably, the STA may support an intra-PPDU power saving mode.

Preferably, the information indicating whether the BSS color is disabled may be received by being included in the frame including the BSS color information.

Preferably, the information indicating whether the BSS color is disabled may be received through a beacon frame from the AP.

Preferably, the information indicating whether the BSS color is disabled may be received through a response frame in response to a request frame transmitted from the STA to the AP.

Preferably, after entering the doze state, the STA may operate a network allocation vector (NAV) timer of the STA during the doze state and determine that a medium is busy.

Preferably, after entering the doze state, the STA may access a medium at the end of the frame by transitioning to an awake state.

In a second aspect of the present invention, provided herein is a method for reducing power consumption of a station (STA) by an access point (AP) in a wireless local area network (WLAN) system, including: detecting a basic service set (BSS) color collision with an overlapping BSS (OBSS); and transmitting, to the STA, a frame including BSS color disabled information set to a first value for indicating that BSS color information is disabled. In this case, the BSS color disabled information set to the first value may indicate that the STA should not transition to a doze state based on a BSS color.

Preferably, the BSS color disabled information set to the first value may indicate that the STA should not transition to the doze state until an end of the frame received by the STA regardless of whether a BSS color included in the BSS color information is identical to that of a BSS to which the STA belongs and whether the frame is intended for the STA.

Preferably, the frame may include a beacon frame or a response frame in response to a request frame transmitted from the STA to the AP.

In a third aspect of the present invention, provided herein is a station (STA) for reducing power consumption in a wireless local area network (WLAN) system, including: a transceiver configured to receive a first frame including basic service set (BSS) Color Disable information and a second frame including BSS color information; and a processor connected to the transceiver. In this case, the processor may be configured to process the first and second frames and, when a BSS color included in the BSS color information is identical to that of a BSS to which the STA belongs, the second frame is not intended for the STA, and the BSS color disabled information does not indicate that that the BSS color information is disabled, control to enter a doze state until an end of the second frame.

In a fourth aspect of the present invention, provided herein is an access point (AP) for reducing power consumption of a station (STA) in a wireless local area network (WLAN) system, including: a transceiver configured to transmit, to the STA, a first frame including basic service set (BSS) information and a second frame including BSS color disabled information; and a processor connected to the transceiver and configured to, when a BSS color collision with an overlapping BSS (OBSS) is detected, set the BSS color disabled information of the first frame to a first value for indicating that the BSS color information is disabled. In this case, the BSS color disabled information set to the first value may indicate that the STA should not transition to a doze state based on a BSS color Advantageous Effects According to embodiments of the present invention, it is possible to efficiently reduce power consumption of an STA even when there is a BSS color collision.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

FIG. 6 is a diagram for explaining a format of an HE Operation Parameter field according to an embodiment of the present invention.

BEST MODE FOR INVENTION

Hereinafter, preferred embodiments of the present invention will be described in detail with reference to the accompanying drawings. It is to be understood that the detailed description which will be disclosed along with the accompanying drawings is intended to describe the exemplary embodiments of the present invention, and is not intended to describe a unique embodiment which the present invention can be carried out. In addition, the detailed description includes specific details for the purpose of providing a thorough understanding of the present invention. However, it will be apparent to those skilled in the art that the present invention may be practiced without the specific details.

Figure 1:
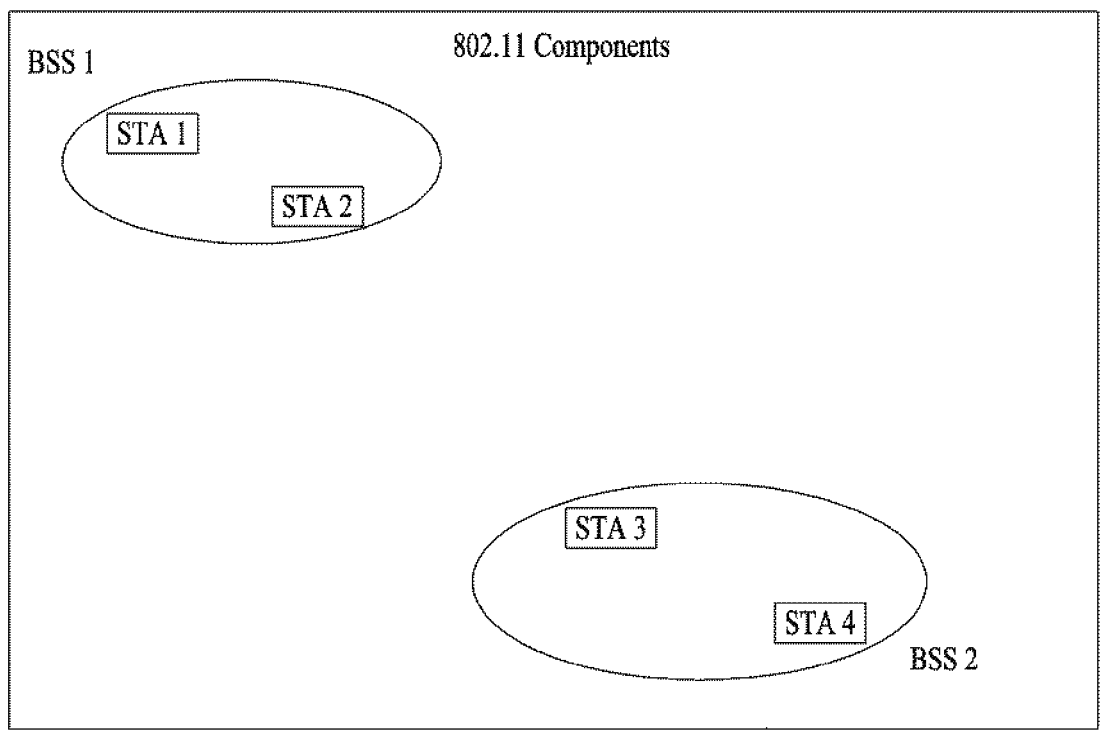
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
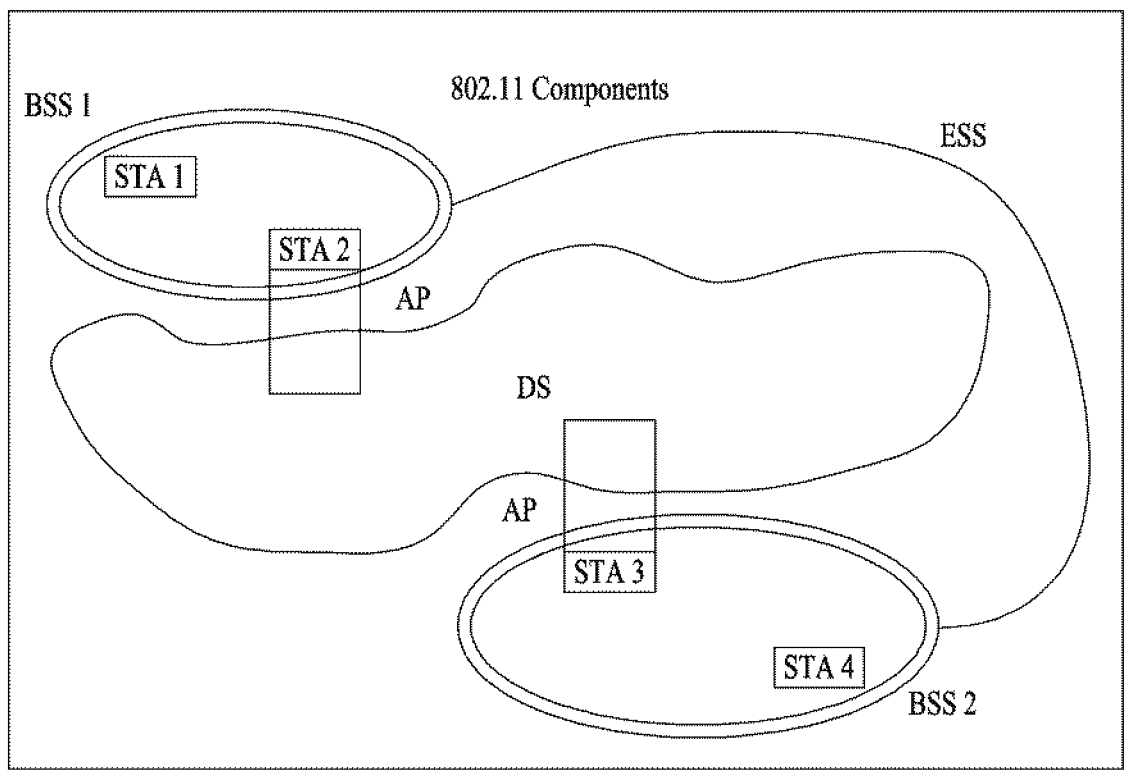
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
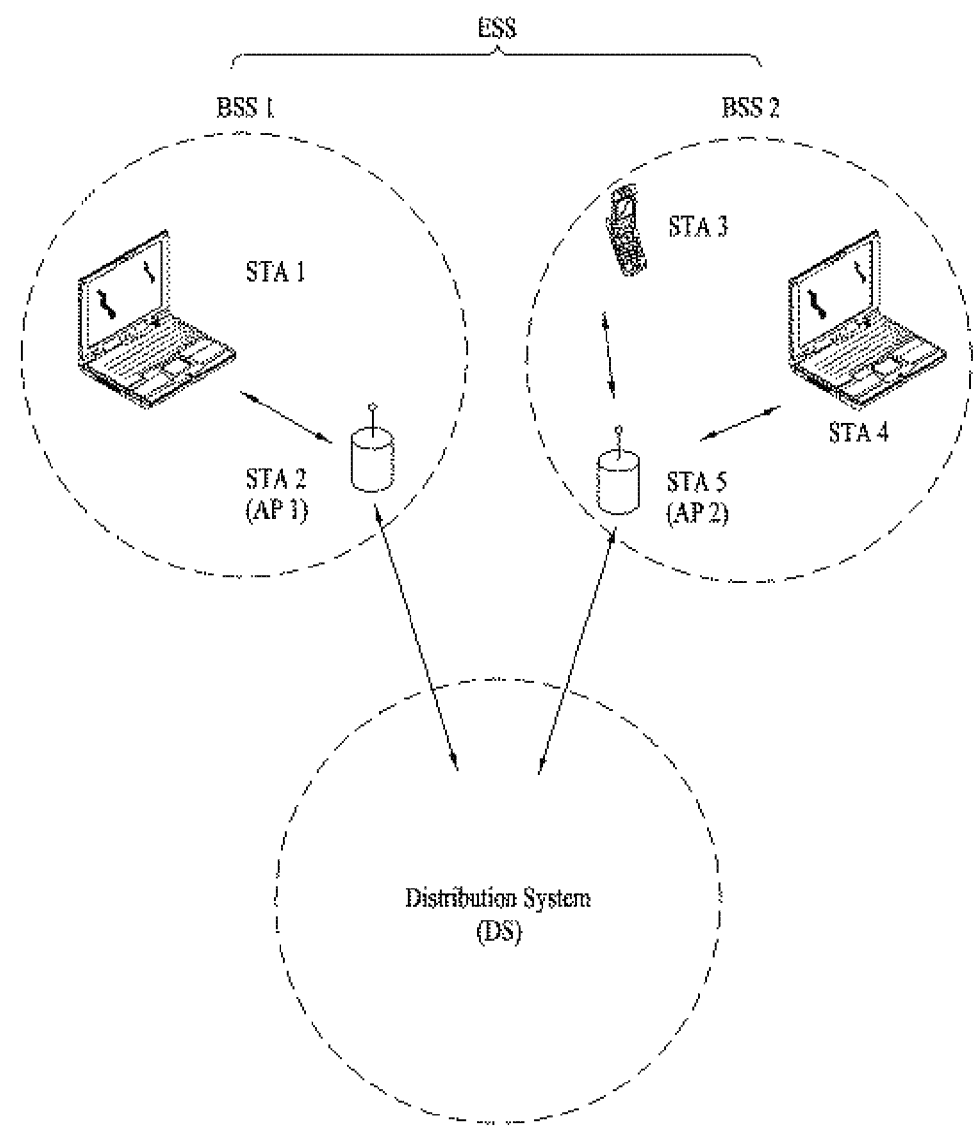
FIG. 3 is a diagram for an exemplary configuration of a WLAN system.

FIG. 3 is a diagram for an exemplary configuration of a WLAN system. FIG. 3 shows an example of a base structure BSS including a DS.

According to an example shown in in FIG. 3, a BSS 1 and a BSS 2 construct an ESS. In a WLAN system, an STA corresponds to a device operating according to MAC/PHY regulation of IEEE 802.11. An STA includes an AP STA and a non-AP STA. In general, the non-AP STA corresponds to such a device directly handled by a user as a laptop computer, a mobile phone and the like. In the example of FIG. 3, an STA 1, an STA 3 and an STA 4 correspond to the non-AP STA and an STA 2 and an STA 5 correspond to the AP STA.

In the following description, the non-AP STA may be referred to as a terminal, a WTRU (wireless transmit/receive unit), a UE (user equipment), an MS (mobile station), a mobile terminal, an MSS (mobile subscriber station) and the like. And, an AP is a concept corresponding to a BS (base station), a Node-B, an eNB (evolved Node-B), a BTS (base transceiver system), a femto BS, and the like in a different wireless communication field.

The present invention relates to a power saving mode of an STA in the next-generation WLAN system (802.11ax), and more particularly, to intra-PPDU PS operation of an HE-STA for an HE PPDU (e.g., HE UL SU PPDU, HE MU PPDU, HE trigger-based PPDU, etc.) including a BSS color.

Before describing the embodiments of the present invention, the power saving mechanism in the 11ax will be described in brief.

Figure 4:
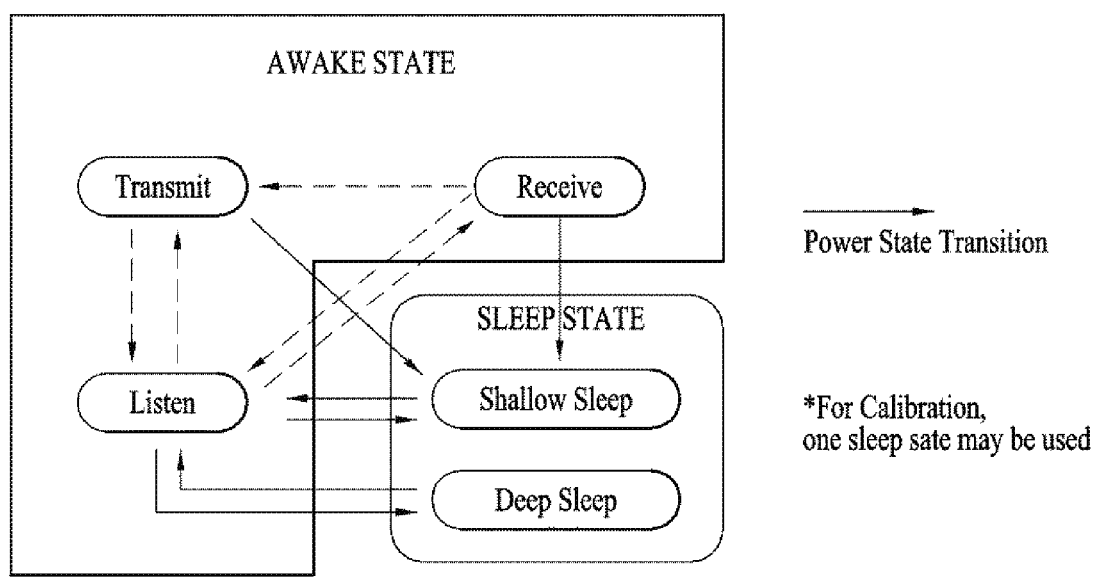
FIG. 4 illustrates awake and sleep states defined in the 11ax.

FIG. 4 illustrates awake and sleep states defined in the 11ax.

In general, the sleep state (or doze stat) may include shallow sleep and deep sleep states. The deep sleep state means a state that consumes minimum power (non-zero) but requires maximum time to transition to a listen state. On the contrary, the shallow sleep state means a state that consumes less power but requires more time to transition to the listen state than the deep sleep state.

Meanwhile, the shallow sleep and deep sleep states can also be defined as follows. The deep sleep state is defined as a sleep state with the wireless radio turned off, i.e., a sleep state in which, RF, baseband and MAC processors are all switched off. In this case, only leakage power is consumed. On the other hand, the shallow sleep state is defined as a sleep state in which baseband and MAC processors are turned on but RF is switched off.

Table 1 shows an example of power consumption in the deep sleep state.

TABLE 1

| Power State parameters Average Current Consumption [mA] Voltage = 1.1 V, Band = {2.4 GHz, 5 GHz}, NSS = {1}, Number of TX/RX antennas = {1}, TX power per antenna = {15 dBm} | | | |
| --- | --- | --- | --- |
| Power State | Bandwidth = {20 MHz} | Bandwidth = {40 MHz} | Bandwidth = {80 MHz} |
| Transmit | 280 mA | 280 mA | 280 mA |
| Receive | 100 mA | 140 mA | 200 mA |
| Listen | 50 mA | 60 mA | 75 mA |
| Shallow Sleep | 0.9 mA | 0.9 mA | 0.9 mA |
| Deep Sleep | 0.09 mA | 0.09 mA | 0.09 mA |

Table 2 shows power and latency transitions between states in 802.11ax.

TABLE 2

| Power Transition parameters | | |
| --- | --- | --- |
| State Transitions | Transition Time (ms) | Average Power Consumption (mW) |
| Transmit to Listen | $T_{TL}$ = 0.01 ms | 75 mW |
| Receive ⇔ Listen | 0.001 ms | 55 mW |
| Listen to Transmit | $T_{LT}$ = 0.01 ms | $P_{LT}$ = 100 mW |
| Transmit to Shallow Sleep | $T_{TS}$ = 0.01 ms | $P_{TS}$ = 15 mW |
| Receive to Shallow Sleep | $T_{RS}$ = 0.2 ms | PRS = 15 mW |
| Listen to Shallow Sleep | $T_{LS}$ = 0.2 ms | PLS = 5 mW |
| Shallow Sleep to Listen | 0.5 ms ($T_{SL}$) | |
| Listen to Deep Sleep | $T_{LD}$ = 1 ms | $P_{DS}$ = 5 mW |
| Deep Sleep to Listen | $T_{SDL}$ = 10 ms | |

If an STA supporting the HE PPDU (hereinafter referred to as an HE STA) receives an intra-BSS PPDU (e.g., non-HT, HT, VHT or HE PPDU) but the received intra-BSS PPDU is not intended for the corresponding STA, the STA can transition to the doze state to reduce power consumption.

Intra-PPDU PS operation for HE PPDU

If an HE STA receives an intra-BSS PPDU that is not intended for the corresponding HE STA, the HE STA can transition to the doze state to reduce power consumption. In this case, the HE STA may use BSS color information included in an HE-SIG-A field to determine whether an HE PPDU is the intra-BSS PPDU.

Figure 5:
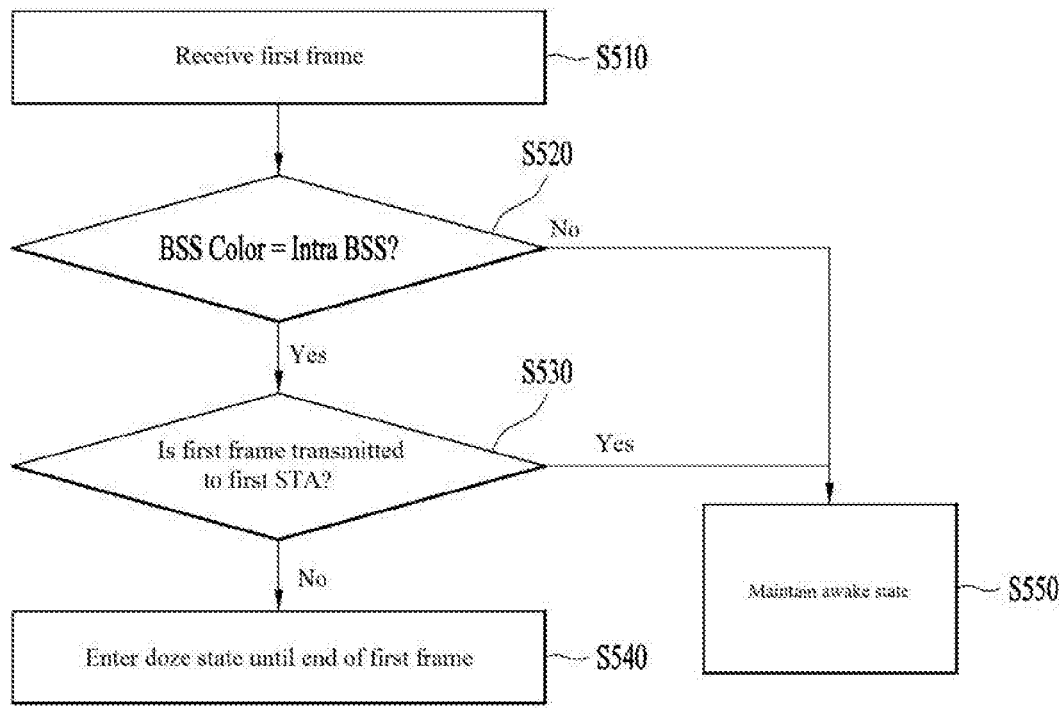
FIG. 5 is a diagram for explaining an intra-PPDU power saving method according to an embodiment of the present invention.

FIG. 5 is a diagram for explaining an intra-PPDU power saving method according to an embodiment of the present invention.

As shown in FIG. 5, when an STA receives a specific frame (a first frame) [S510], the STA can determine whether a BSS color of the received first frame matches a BSS color of a BSS associated with the STA [S520]. If the BSS color of the received first frame is different from its BSS color, the STA maintains an awake state [S550]. If the BSS color of the first frame matches its BSS color and the first frame is not intended for itself [S530], the STA can enter the doze state until the end of the first frame [S540].

Specifically, the HE STA may enter the doze state in the following cases: (i) if the HE STA receives an HE DL MU PPDU (where UL FLAG=0), BSS color information of the corresponding PPDU matches BSS color information of a BSS associated with the HE STA, and an identifier of the corresponding STA or a broadcast/multicast identifier is not included in an HE-SIG-B field, the HE STA may enter the doze state until the end of an HE DL MU PPDU; (ii) if the HE STA receives a HE UL MU PPDU (where UL FALG=1), and BSS color information of the corresponding PPDU matches the BSS color information of the BSS associated with the HE STA, the HE STA may enter the doze state until the end of the HE UL MU PPDU; and (iii) if the HE STA receives an HE SU PPDU, BSS color information of the corresponding PPDU matches the BSS color information of the BSS associated with the HE STA, and a UL/DL indicator indicates UL, the HE STA may enter the doze state until the end of the HE SU PPDU.

BSS Color Collision Problem

According to the 11ax intra-PPDU power saving operation, if a BSS color included in an HE-SIG-A field matches a BSS color of an AP associated with an HE STA, the HE STA can enter the doze state during the rest of corresponding PPDU duration to reduce power consumption. However, if a neighboring BSS uses the corresponding BSS color, the HE STA may receive an HE PPDU from an OBSS and then enter the doze state. In this case, the HE STA may not receive a PPDU intended for the HE STA.

Since BSS color information included in the HE-SIG-A has a length of 6 bits, a BSS color collision with a neighboring BSS may occur. Although the size of the BSS color information may be increased for the purpose of solving the problem, it may cause unnecessary signaling overhead.

In addition, although information indicating whether the STA should perform the power saving operation may be transmitted in each PPDU transmission to preventing the STA to perform an erroneous intra-PPDU power saving operation when the BSS color collision occurs, it may also cause unnecessary signaling overhead.

Therefore, it is proposed in a preferred embodiment of the present invention that when an AP detects the BSS color collision, the AP instructs the STA to disable BSS color based operation.

Method for Disabling BSS Color Based Operation

According to the present invention, the AP can disable or enable STAs to perform intra-PPDU power saving operations based on BSS colors. When detecting the BSS color collision (that is, it is determined that a neighboring BSS uses the same BSS color), the AP can disable the BSS Color based Intra-PPDU operations of the corresponding STAs.

FIG. 6 is a diagram for explaining a format of an HE Operation Parameter field according to an embodiment of the present invention.

HE STAs in an HE BSS can be controlled through an HT Operation element, VHT Operation element and HE Operation element. Among these elements, the HE operation element related to HE operation is shown in FIG. 6.

In FIG. 6, a BSS color field may indicate a BSS color of the BSS corresponding to the AP, IBSS STA, mesh STA or TDLS STA that transmits the corresponding element. In the present embodiment, it is assumed that the size of the BSS color is 6 bits.

Meanwhile, the HE Operation element can include a BSS Color Disabled subfield as shown in FIG. 6. According to the present invention, if an AP recognizes that its BSS color overlaps with that of a neighboring BSS, the AP may set the BSS Color Disabled subfield to 1 to disable the BSS color based operation. Otherwise, the AP may set the corresponding subfield to 0.

Figure 7:
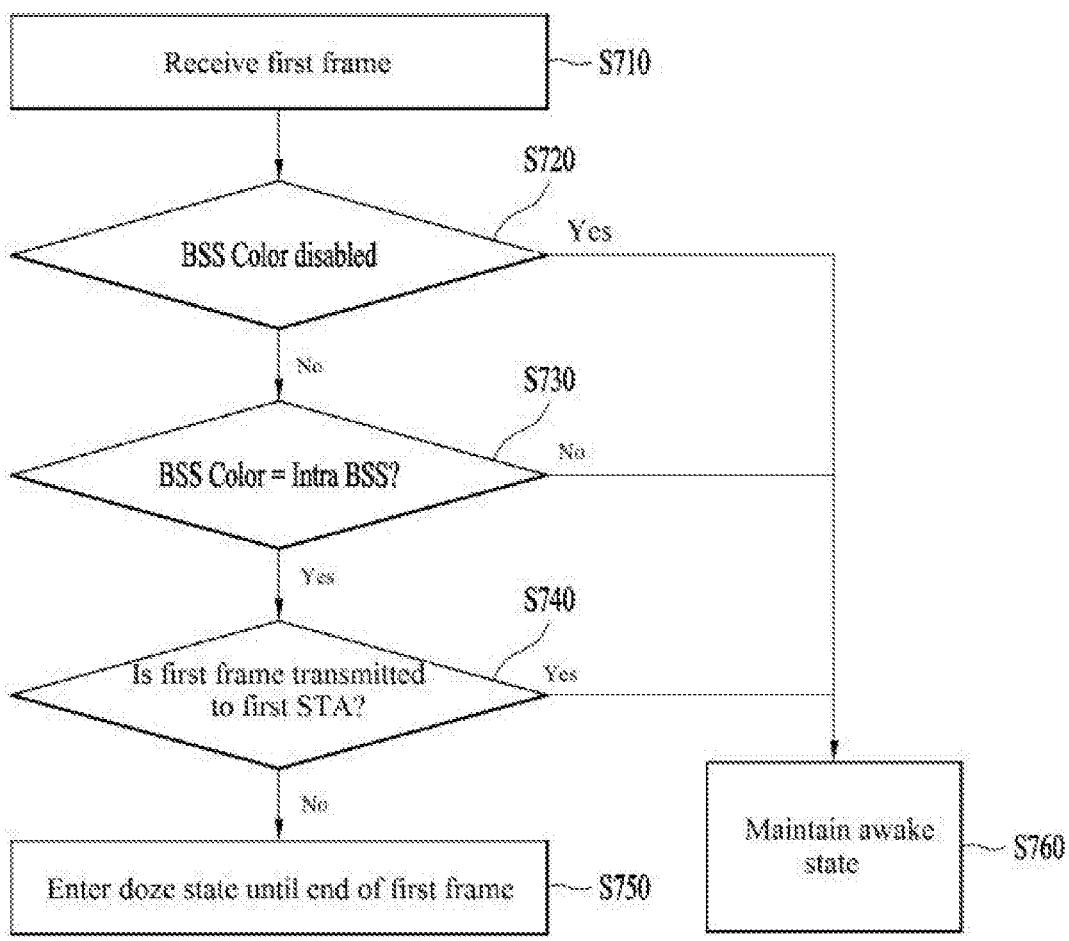
FIG. 7 is a diagram for explaining an intra-BSS power saving method for an STA according to an embodiment of the present invention.

FIG. 7 is a diagram for explaining an intra-BSS power saving method for an STA according to an embodiment of the present invention.

Referring to FIG. 7, when receiving a first frame [S710], an STA determines whether the value of the BSS Color Disabled field of the most recently received HE Operation element is 1 or 0 [S720]. Hereinafter, reception of the HE Operation Element will be described in detail.

When the value of the BSS Color Disabled field is set to 1, i.e., the BSS Color Disabled field indicates that the BSS color based operation is disabled, the STA does not perform the intra-PPDU power saving operation and maintains the awake state [S760]. When the BSS Color Disabled field is set to 0, the STA compares its BSS color with a BSS color contained in the received first subframe as described with reference to FIG. 5 [S730]. Thereafter, the STA determines whether the first frame is intended for the corresponding STA [S740] and then determines whether to enter the doze state for the intra-PPDU power saving [S750].

Specifically, the HE STA may enter the doze state in the following cases: (i) if the HE STA receives an HE DL MU PPDU (where UL FLAG=0), BSS color information of the corresponding PPDU matches BSS color information of a BSS associated with the HE STA, an identifier of the corresponding STA or a broadcast/multicast identifier is not included in an HE-SIG-B field, and a BSS Color Disabled field of the most recently received HE Operation element is set to 0, the HE STA may enter the doze state until the end of an HE DL MU PPDU; (ii) if the HE STA receives a HE UL MU PPDU (where UL FALG=1), BSS color information of the corresponding PPDU matches the BSS color information of the BSS associated with the HE STA, and the BSS Color Disabled field of the most recently received HE Operation element is set to 0, the HE STA may enter the doze state until the end of the HE UL MU PPDU; and (iii) if the HE STA receives an HE SU PPDU, BSS color information of the corresponding PPDU matches the BSS color information of the BSS associated with the HE STA, a UL/DL indicator indicates UL, and the BSS Color Disabled field of the most recently received HE Operation element is set to 0, the HE STA may enter the doze state until the end of the HE SU PPDU.

After entering the doze state, the STA can operate a NAV timer of the STA during the doze state and determine that a medium is busy.

In addition, after entering the doze state, the STA can transition to the awake state at the end of the first frame and then attempt to access the medium.

Hereinafter, a method for transmitting an indication of 'BSS Color Disabled' will be described.

According to the first embodiment, it is proposed to transmit the BSS Color Disabled indication in a broadcasting manner.

Figure 8:
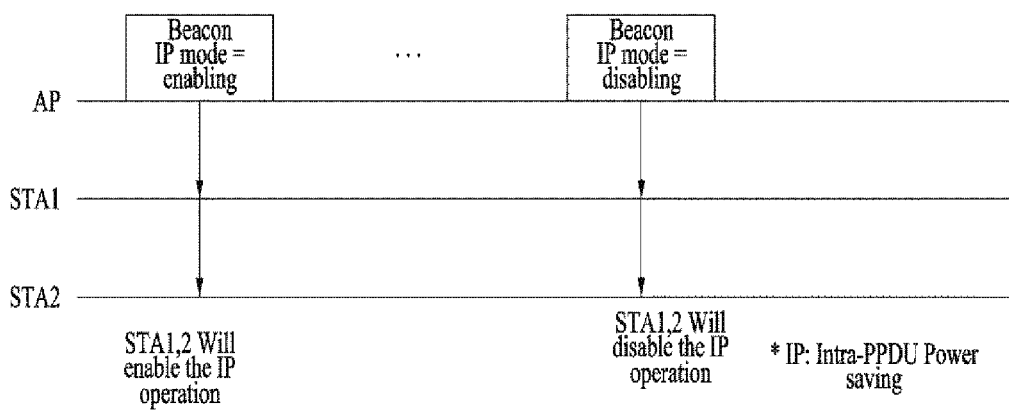
FIG. 8 is a diagram illustrating a method for transmitting an indication of 'BSS Color Disabled' through a beacon according to an embodiment of the present invention.

FIG. 8 is a diagram illustrating a method for transmitting an indication of 'BSS Color Disabled' through a beacon according to an embodiment of the present invention.

Referring to FIG. 8, an AP can inform, through a beacon, whether the intra-PPDU power saving (IP) is enabled or disabled. Specifically, to inform STAs whether the BSS color based intra-PPDU power saving is enabled or disabled, the AP may add a new element (e.g., the BSS Color Disabled field) to the beacon frame or add a new field to the existing element. That is, after receiving the beacon frame, the STAs, which are associated with the AP, can recognize whether the BSS color based intra-PPDU power saving. If the beacon frame indicates that the BSS color based intra-PPDU power saving is disabled, the corresponding STAs do not perform the intra-PPDU power saving operation until the intra-BSS PPDU power saving operation is enabled.

According to the second embodiment, it is proposed to transmit the BSS Color Disabled indication in accordance with a request from an STA.

Figure 9:
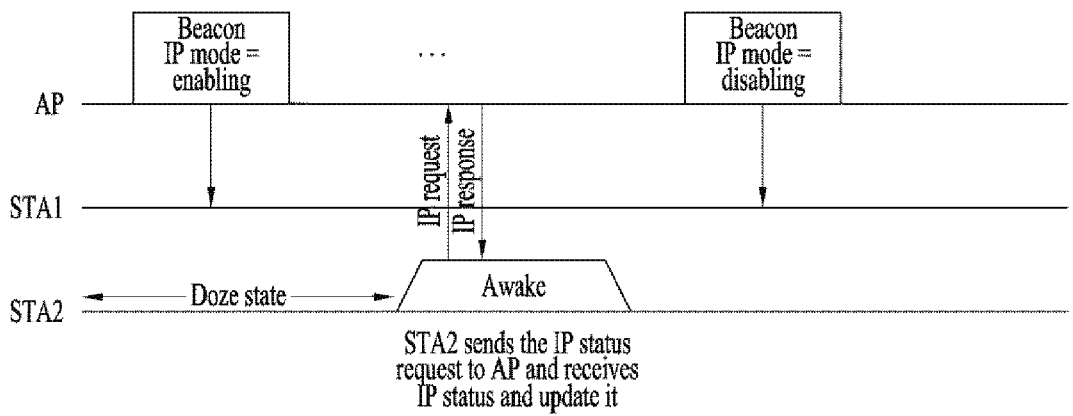
FIG. 9 is a diagram illustrating a method for transmitting an indication of 'BSS Color Disabled' through a response message in response to a request from an STA according to an embodiment of the present invention.

FIG. 9 is a diagram illustrating a method for transmitting an indication of 'BSS Color Disabled' through a response message in response to a request from an STA according to an embodiment of the present invention.

As shown in FIG. 9, when an AP informs that an IP mode is enabled through a beacon, an STA performs IP operation. In this case, the STA can request the AP to transmit an intra-BSS PPDU power saving operation state i.e., to inform whether the intra-BSS PPDU power saving operation is enabled or disabled.

When receiving the request for the intra-BSS PPDU power saving operation state from the STA, the AP can transmit information on the intra-BSS PPDU power saving operation state through a response frame. For example, if power saving STAs fail to receive intra-PPDU PS state information transmitted in a broadcasting manner, the power saving STAs can receive the intra-PPDU PS state information (i.e., information indicating whether the intra-PPDU PS is enabled or disabled) from the AP.

The state request information may be transmitted to the AP by being piggybacked on another frame or in the form of a request frame.

According to the third embodiment, it is proposed to transmit the BSS Color Disabled indication irrespective of a request from an STA.

Figures 10, 11:
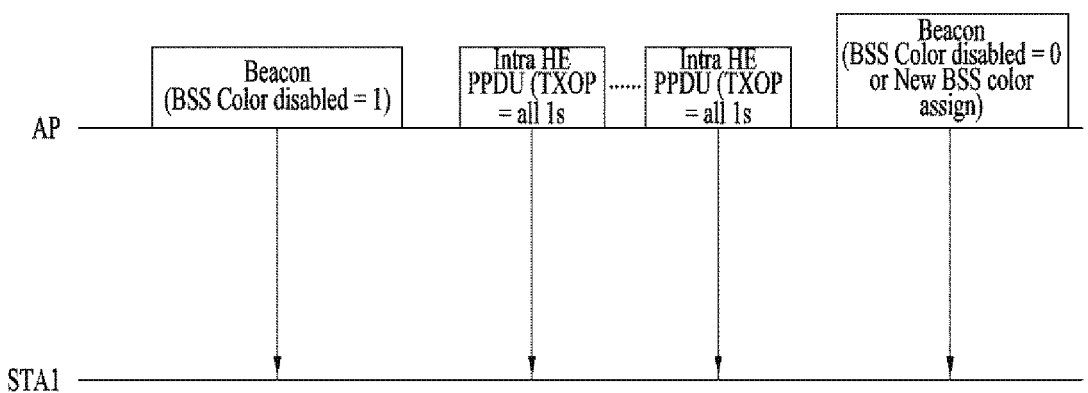
FIG. 10 is a diagram illustrating a method for transmitting an indication of 'BSS Color Disabled' irrespective of a request from an STA according to an embodiment of the present invention.
FIG. 11 is a diagram for explaining a method for controlling a NAV configuration according to an embodiment of the present invention.

FIG. 10 is a diagram illustrating a method for transmitting an indication of 'BSS Color Disabled' irrespective of a request from an STA according to an embodiment of the present invention.

If an intra-BSS PPDU power saving operation state is changed (e.g., from an enabled state to a disabled state and vice versa), an AP can transmit information on the intra-BSS PPDU power saving operation state by piggybacking the information on a frame to be transmitted to STAs. For example, the AP may include the information in an HE variant HT Control field to transmit the information to the STAs. Particularly, the information may be included in a Receiver Operation Mode Indication (ROMI) HT Control field of the HE variant HT Control field.

The aforementioned methods can be combined with each other. For example, the HE operation element shown in FIG. 6 may be included in the first frame shown in FIG. 7 or the beacon/response frame.

The state information transmitted from the AP may be transmitted by being included in not only an HE Control field but also an A-MPDU or single MPDU.

Configurations of BSS Color Disabled and TXOP Duration Fields

As described above, when a BSS color collides with that of a neighboring BSS, an STA may apply the intra-PPDU PS to a PPDU transmitted by the neighboring BSS and thus, fail to receive a PPDU transmitted by an AP. Hereinafter, a method for solving this problem will be described.

When the BSS color collision occurs, the AP informs STAs of the occurrence of the BSS color collision through the beacon frame as described above. Thereafter, the STAs can stop BSS color related operations (e.g., Intra-PPDU PS, NAV setting, etc.).

In addition, according an embodiment of the present invention, when the BSS color collision occurs, the AP can select a new BSS color and then inform the new BSS color through the beacon. In this case, the AP informs the BSS color collision and new BSS color during a sufficient time in order for all STAs connected to the BSS to obtain the new BSS color.

According to a preferred embodiment of the present invention, when the HE STAs, which belong to the BSS of the AP and receive the beacon, intend to transmit a HE PPDU, the HE STAs can set a value of a TXOP Duration field of the HE-SIG-A to be different from a normal Duration field value until the new BSS color is applied. For example, although the TXOP Duration field of the HE-SIG-A can be set to all 1s (127), the TXOP Duration field can also be set to a specific value in the above situation. In the following description, it is assumed that the TXOP Duration field of the HE-SIG-A is set to all 1s (127). By doing so, it is possible to prevent malfunction of another STA due to an erroneous NAV configuration.

NAV Update Operation of STA

In the WLAN system, an STA accesses a medium based physical sensing and logical sensing and in this case, the logical sensing is achieved through NAV control of the STA.

For example, if an STA receives a frame that is not intended for itself but valid, the STA may update its NAV based on the value of a Duration field of the frame and then determine that a medium is busy.

Particularly, if the STA receives at least one valid frame through a PSDU, the STA may update its NAV based on the Duration field of the PSDU. However, if an RA field of the PSDU is equal to an MAC address of the STA, the STA does not update the NAV.

In addition, when an AP recognizes the BSS color collision and when the AP transmits a frame with a duration value set to all 1s, it is preferred that the STA does not update its NAV after receiving the frame.

Meanwhile, for the 11ax system, it is currently discussed that the STA manages not only the NAV for its BSS but also a NAV for another BSS separately. Hereinafter, this will be described in detail.

An HE STA can manage not only an intra-BSS NAV as a NAV for the inside of a BSS but also a heterogeneous NAV such as an inter-BSS NAV as a NAV for the outside of the BSS. Although the inter-BSS NAV can be referred to as a regular NAV, it is apparent that the other can be called the regular NAV.

When the STA managing the two NAVs receives a PSDU of an intra-BSS frame, the STA can update the intra-BSS NAV based on Duration field information of the received PSDU. In addition, when receiving a PSDU of an inter-BSS frame, the STA can update the regular NAV based on Duration field information of the received PSDU.

Although the above example describes that the NAV (i.e., intra-BSS NAV or regular NAV) is updated based on the Duration field of the received PSDU, the intra-BSS NAV or regular NAV can be updated based on TXOP duration of the HE-SIG-A of a received HE PPDU in the same manner.

If an RA field of the received frame indicates the STA, the STA may not update the NAV. However, the RA field of the received frame does not indicate the STA, the STA may update the NAV based on the duration field of the PSDU or TXOP Duration field information of the HE-SIG-A depending on whether the received frame is the inter-BSS frame or intra-BSS frame.

As described above, when a specific STA supports two NAVs, at least one of the two NAVs is reflected, and at least one NAV counter is not 0, a virtual CS can determine that a medium is busy.

In case such two NAVs are operated, if an STA receives a frame which cannot be identified as the inter-BSS frame or intra-BSS frame similar to a CTS frame or ACK frame, the STA updates the inter-BSS NAV (i.e., regular NAV) according to regulations. Thus, according to the present invention, when the STA cannot identify the received frame as the inter-BSS frame or intra-BSS frame, the STA can update the inter-BSS NAV (regular NAV) even though the BSS color based operation is disabled.

However, when the AP sets the duration value to a specific value (e.g., all 1s) different from a normal duration value, it is preferred that the STA does not update the inter-BSS NAV.

FIG. 11 is a diagram for explaining a method for controlling a NAV configuration according to an embodiment of the present invention.

As shown in FIG. 11, when an AP detects a BSS color collision, the AP can transmit a beacon with the BSS Color Disabled filed set to 1. Thereafter, the AP can set the TXOP Duration field of a PPDU to be transmitted to all 1s in order to prevent erroneous NAV update of an STA.

When receiving a frame including the TXOP Duration field set to all 1s, the STA does not update its NAV.

After completing BSS color change, the AP can set the BSS Color Disabled field to 0 and then transmit the BSS Color Disabled field to the STA.

That is, when the TXOP Duration field of the HE-SGI-A is set to all 1s (i.e., 127), the HE STA does not perform the intra-PPDU PS even though the BSS color is an intra-BSS color. Instead, the HE STA performs payload (PSDU) decoding for the purpose of obtaining MAC Duration. In other words, when the TXOP Duration field is set to all 1s (127), the HE STA neither enter the doze state nor update the NAV.

Hereinafter, a description will be given of a case in which an HE STA receives an intra-PPDU having TXOP duration set to a normal value (i.e., a value rather than all 1s) when the BSS color based operation is disabled.

Figure 12:
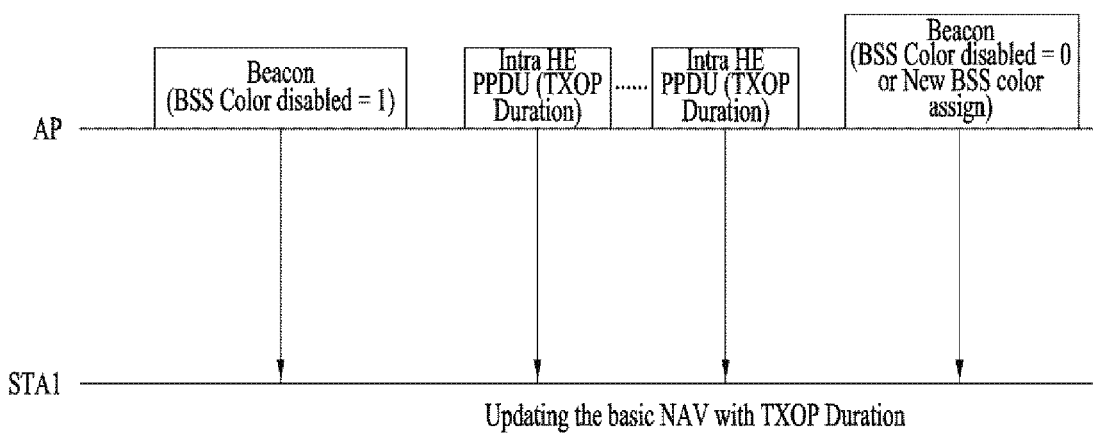
FIG. 12 is a diagram for explaining a NAV update method when TXOP duration has a normal value according to an embodiment of the present invention.

FIG. 12 is a diagram for explaining a NAV update method when TXOP duration has a normal value according to an embodiment of the present invention.

Similar to the above embodiments, it is also assumed in FIG. 12 that an AP sets the BSS Color Disabled field to 1. That is, since the BSS color based operation is disabled, an STA cannot distinguish if a PPDU is the intra-PPDU or inter PPDU. Therefore, it is preferred that the STA updates a basic (regular) NAV rather than an intra-BSS NAV using a value in the TXOP Duration field after considering the corresponding PPDU as an unidentified PPDU.

That is, according to the present embodiment, the STA can determine a received frame as an intra-BSS frame under the following condition.

TABLE 3

A frame received by the STA is an intra-BSS frame if one of the following conditions is true:
The RXVECTOR parameter BSS_COLOR in the received PPDU carrying the frame is the same as the BSS color announced by the AP to which the STA is associated and the most recently received HE Operation element from the AP to which it is associated contained a value of 0 in the BSS Color Disabled subfield In addition, the STA can update the intra-BSS NAV when the following conditions are met.

TABLE 4

A STA shall update the intra-BSS NAV with the duration information indicated by the RXVECTOR parameter TXOP_DURATION if and only if all the following conditions are met:
The RXVECTOR parameter TXOP_DURATION is not set to all 1s
The PPDU that carried information of the RXVECTOR parameter is identified as intra-BSS according to the rule described in 27.2.1

Figure 13:
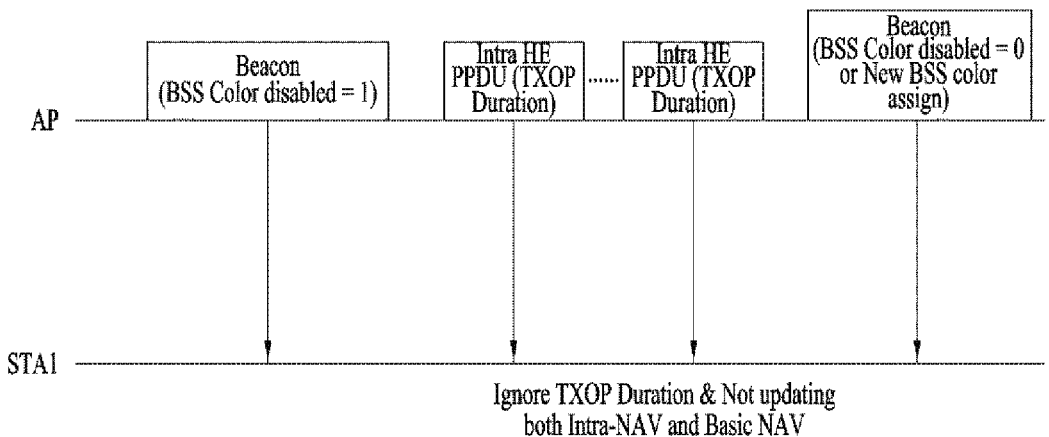
FIG. 13 is a diagram for explaining a NAV update method when TXOP duration is set to 'all 1s' according to an embodiment of the present invention.

TABLE 4-continued (Intra-BSS and inter-BSS frame detection) and the most recently received HE Operation element from the AP to which it is associated contained a value of 0 in the BSS Color Disabled subfield
The STA does not receive a frame with the duration information indicated by a Duration field in the PSDU of the PPDU carrying the RXVECTOR parameter TXOP_DURATION
The duration information indicated by the RXVECTOR parameter TXOP_DURATION is greater than the STA's current intra-BSS NAV
The PPDU that carried information of the RXVECTOR parameter is not an HE trigger-based PPDU triggered by the STA FIG. 13 is a diagram for explaining a NAV update method when TXOP duration is set to 'all 1s' according to an embodiment of the present invention.

Referring to FIG. 13, when the BSS Color Disabled field included in the most recently received HE Operation element from an associated AP is set to 1, an STA does not consider a received frame as the intra-BSS frame even though RXVECTOR parameter BSS_COLOR is equal to BSS_COLOR of the AP associated with the STA. That is, the STA does not update the intra-BSS NAV. Instead, after considering the corresponding frame as an unidentified frame, the STA updates the basic (regular) NAV according to the RXVECTOR TXOP_DURATION field of the received PPDU. When the TXOP Duration field of the received frame is set to all 1s, it is preferred that the STA does not update even the basic (regular) NAV.

Duration Set to All 1s and EIFS Operation

According to the above-mentioned method, when an OBSS STA receives the corresponding PPDU, the OBSS STA does not update the NAV based on the TXOP Duration field with respect to the PPDU due to the TXOP Duration field set to all 1s. Therefore, there may occur a problem that the corresponding PPDU is not protected.

To solve the problem, according to an embodiment of the present invention, it is proposed to invoke the EIFS operation when decoding of a MAC data payload of the received PPDU is impossible.

Particularly, assuming that an HE STA receives the intra-PPDU when the BSS color based operation is disabled (when a BSS color indicated by the received PPDU is equal to that of an AP associated with the HE STA, the HE STA assumes a BSS color based intra-PPDU), the HE STA neither update the intra-BSS NAV nor basic (regular) NAV based on the TXOP Duration field. That is, the HE STA discards the value of the TXOP Duration field. In addition, when decoding of the MAC data payload of the received PPDU is impossible, the EIFS operation is invoked. In other words, when the BSS color based operation is disabled (i.e., the BSS Color Disabled field is set to 1), the EIFS can be called even though a valid TXOP_Duration parameter is included in RXVECTOR of the received PPDU (that is, when the TXOP Duration field is not set to all 1s, it is considered to be valid).

Therefore, when the valid TXOP Duration parameter is included in the RXVECTOR of the received PPDU and the BSS Color Disabled subfield included in the most recently received HE Operation element from the associated AP is set to 0, the EIFS is not invoked.

It can be summarized as shown in Table 5.

TABLE 5

Figure 14:
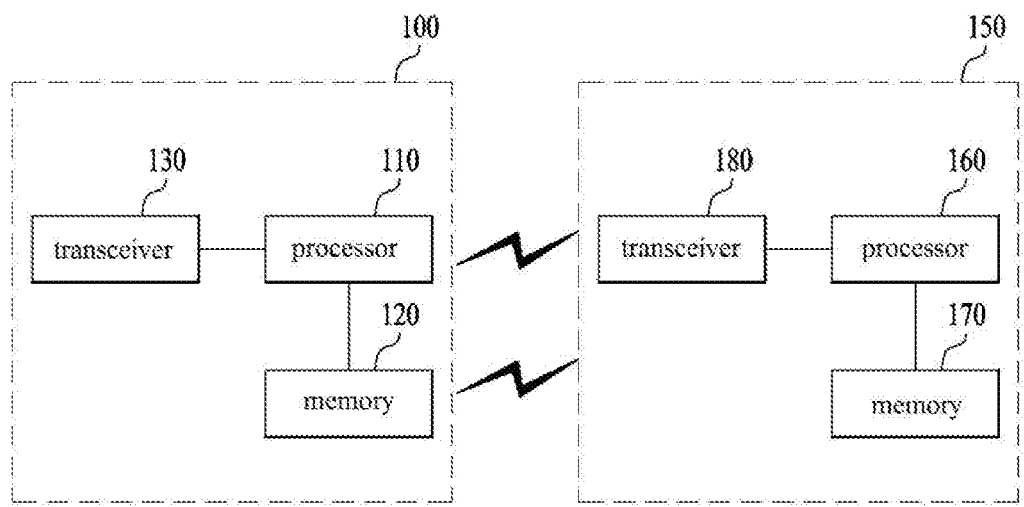
FIG. 14 is a block diagram illustrating exemplary configurations of an AP device (or base station device) and an STA device (or user equipment device) according to an embodiment of the present invention

A DCF of HE STAs shall use EIFS before transmission, when it determines that the medium is idle following reception of a frame for which the PHY-RXEND.indication primitive contained an error or a TABLE 5-continued frame for which the FCS value was not correct and the most recently received HE Operation element from the AP to which it is associated contained a value of 0 in the BSS Color Disabled subfield.
EIFS shall not be invoked if a valid TXOP_DURATION parameter is present in the RXVECTOR of a received HE PPDU and the most recently received HE Operation element from the AP to which it is associated contained a value of 0 in the BSS Color Disabled subfield Apparatus Configuration FIG. 14 is a block diagram for an exemplary configuration of an AP (or a base station) and an STA (or a UE) according to one embodiment of the present invention.

An AP 100 can include a processor 110, a memory 120, and a transceiver 130. An STA 150 can include a processor 160, a memory 170, and a transceiver 180.

The transceiver 130/180 can transmit/receive a radio signal and implement a physical layer according to IEEE 802 system. The processor 110/160 is connected with the transceiver 130/180 and can implement a physical layer and/or a MAC layer according to IEEE 802 system. The processor 110/160 is configured to perform an operation according to one or a combination of two or more embodiments of the present invention. A module for implementing operations of the AP and the STA according to the various embodiments of the present invention is stored in the memory 120/170 and the module can be executed by the processor 110/160. The memory 120/170 can be connected with the processor 110/160 via a well-known media in a manner of being included in the processor 110/160 or being installed in the outside of the processor 110/160.

Explanation on the AP 100 and explanation on the STA 150 can be respectively applied to a base station and a user equipment in a different wireless communication system (e.g., LTE/LTE-A system).

The configurations of the AP and the STA as described above may be implemented such that the above-described embodiments can be independently applied or two or more thereof can be simultaneously applied, and description of redundant parts is omitted for clarity.

Figure 15:
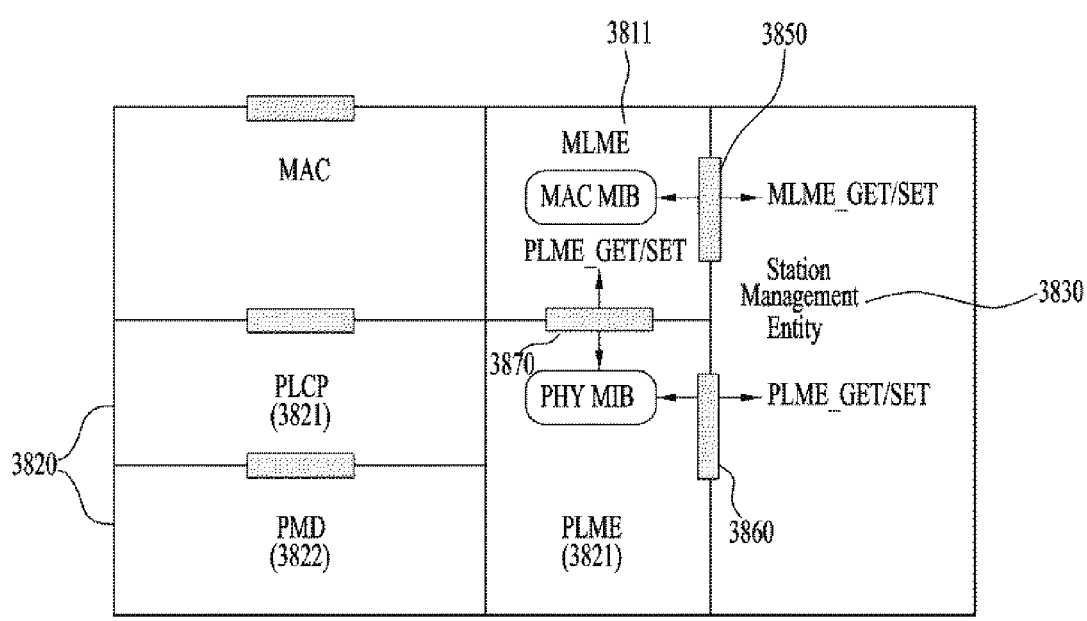
FIG. 15 illustrates an exemplary structure of a processor of an AP or STA device according to an embodiment of the present invention.

FIG. 15 is a diagram for an exemplary configuration of a processor of an AP or an STA according to one embodiment of the present invention.

A processor of an AP or an STA may have a structure of a plurality of layers. FIG. 15 mainly shows a MAC sublayer 3810 and a physical layer 3820 on a DLL (data link layer) among a plurality of the layers. As shown in FIG. 15, the PHY 3820 can include a PLCP (physical layer convergence procedure) entity 3821 and a PMD (physical medium dependent) entity 3822. Both the MAC sublayer 3810 and the PHY 3820 include management entities conceptually referred to as an MLME (MAC sublayer management entity) 3811. The entities 3811/3821 provide a layer management service interface in which a layer management function is operating.

In order to provide a precise MAC operation, an SME (station management entity) 3830 exists in each STA. The SME 3830 corresponds to a layer-independent entity capable of exiting in a separate management plane or capable of being seen as a separate entity (off to the side). Although precise functions of the SME 3830 are not explained in detail in the present specification, the entity 3830 is in charge of collecting lay-dependent status from various layer management entities and similarly configuring values of layer-specific parameters. In general, the SME 3830 performs the aforementioned functions on behalf of a general system management entity and may be able to implement a standard management protocol.

The entities shown in FIG. 15 interact with each other using various schemes. FIG. 15 shows several examples of exchanging GET/SET primitives. XX-GET.request is used to request a value of a given MIB attribute (management information-based attribute information). If status corresponds to "success", XX-GET.confirm primitive returns an appropriate MIB attribute information value. Otherwise, the XX-GET.confirm primitive is used to return an error indication to a status field. XX-SET.request primitive is used to request that an indicated MIB attribute is configured by a given value. If the MIB attribute corresponds to a specific operation, it indicates that the MIB attribute requests to perform the specific operation. If status corresponds to "success", XX-SET.confirm primitive confirms that an MIB attribute is configured by a requested value. Otherwise, the XX-SET.confirm primitive is used to return an error condition to a status field. If the MIB attribute corresponds to a specific operation, it confirms that the specific operation has been performed.

As shown in FIG. 15, the MLME 3811 and the SME 3830 can exchange various MLME_GET/SET primitives with each other via an MLME SAP 3850. And, various PLCM_GET/SET primitives can be exchanged between the PLME 3821 and the SME 3830 via a PLME_SAP 3860 and can be exchanged between the MLME 3811 and the PLME 3821 via a MLME-PLME_SAP 3870.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein. The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

And, both an apparatus invention and a method invention are explained in the present specification and the explanation on the both of the inventions can be complementally applied, if necessary.

INDUSTRIAL APPLICABILITY

As mentioned in the foregoing description, embodiments of the present invention can be applied to various wireless communication systems including IEEE 802.11 system.

What is claimed is:

1. A method for reducing erroneous network allocation vector (NAV) updates by a station (STA) in a wireless local area network (WLAN) system, the method comprising:
   maintaining an inter-BSS network allocation vector (NAV) for an inter-BSS frame and an intra-BSS NAV for an intra-BSS frame;
   receiving, from an access point (AP), basic service set (BSS) color disabled information indicating that a BSS color is disabled;
   receiving a frame including BSS color information and a Transmission Opportunity (TXOP) duration field value,
   wherein the TXOP duration field value of the frame is set to a second value which is out of a first range of values in response to the BSS color disabled information indicating the BSS color is disabled,
   wherein the first range of values of the TXOP duration field are for TXOP duration information, and
   wherein the second value of the TXOP duration field value is for preventing an update of both the inter-BSS NAV and the intra-BSS NAV upon receiving the frame.

2. The method of claim 1, wherein the STA supports an intra-PPDU (Physical Protocol Data Unit) power saving mode.

3. The method of claim 1, wherein the BSS color disabled information is received by being included in the frame including the BSS color information.

4. The method of claim 1, wherein the BSS color disabled information is received through a beacon frame from the AP.

5. The method of claim 1, wherein the BSS color disabled information is received through a response frame in response to a request frame transmitted from the STA to the AP.

6. A method for reducing erroneous network allocation vector (NAV) updates of a station (STA) by an access point (AP) in a wireless local area network (WLAN) system, the method comprising:
   detecting a basic service set (BSS) color collision with an overlapping BSS (OBSS); and
   transmitting, to the STA, a frame including BSS color disabled information and a Transmission Opportunity (TXOP) duration field value,
   wherein the BSS color disabled information indicates that the BSS color is disabled and the STA should not transit to a doze state based on the BSS color,
   wherein the TXOP duration field value is set to a second value, which is out of a first range of values in response to the BSS color disabled information indicating the BSS color is disabled,
   wherein the first range of values of the TXOP duration field value are for TXOP duration information, and
   wherein the second value of the TXOP duration field value is for indicating that the STA should not update both of an inter-BSS network allocation vector (NAV) maintained for an inter-BSS frame and an intra-BSS NAV maintained for an intra-BSS frame.

7. The method of claim 6, wherein the BSS color disabled information indicates that the STA should not transit to the doze state regardless of whether a BSS color of a received frame is identical to a BSS color of a BSS to which the STA belongs and regardless of whether the frame is transmitted for the STA.

8. The method of claim 6, wherein the frame comprises a beacon frame or a response frame in response to a request frame transmitted from the STA to the AP.

9. A station (STA) for reducing erroneous network allocation vector (NAV) updates in a wireless local area network (WLAN) system, the STA comprising:
   a transceiver configured to receive:
      basic service set (BSS) Color Disabled information indicating that a BSS color is disabled, and
      a frame including BSS color information and a Transmission Opportunity (TXOP) duration field value,
      wherein the TXOP duration field value of the frame is set to a second value which is out of a first range of values in response to the BSS color disabled information indicating the BSS color is disabled, and
      wherein the first range of values of the TXOP duration field are for TXOP duration information; and
   a processor connected to the transceiver,
      wherein the processor is configured to maintain an inter-BSS network allocation vector (NAV) for an inter-BSS frame and an intra-BSS NAV for an intra-BSS frame, and
      wherein the second value of the TXOP duration field value of the frame is for preventing the processor from updating both of the inter-BSS NAV and the intra-BSS NAV upon receiving the frame.

10. An access point (AP) for reducing erroneous network allocation vector (NAV) updates of a station (STA) in a wireless local area network (WLAN) system, the AP comprising:
   a transceiver configured to transmit, to the STA,
      basic service set (BSS) information indicating that a BSS color is disabled, and
      a frame including BSS color disabled information and a Transmission Opportunity (TXOP) duration field value; and
   a processor connected to the transceiver and configured to detect a BSS color collision with an overlapping BSS (OBSS), and to set the BSS color disabled information of the frame to a first value for indicating that the BSS color is disabled,
   wherein the BSS color disabled information set to the first value indicates that the STA should not transit to a doze state based on the BSS color,
   wherein the TXOP duration field value is set to a second value, which is out of a first range of values in response to the BSS color disabled information indicating the BSS color is disabled, and
   wherein the first range of values of the TXOP duration field value are for TXOP duration information, and wherein the second value of the TXOP duration field value is for indicating that the STA should not update both of an inter-BSS network allocation vector (NAV) maintained for an inter-BSS frame and an intra-BSS NAV maintained for an intra-BSS frame.

* * * * *